(12) United States Patent
Fischer et al.

(10) Patent No.: US 10,198,681 B2
(45) Date of Patent: Feb. 5, 2019

(54) VALUE OR SECURITY DOCUMENT COMPRISING AN ELECTRONIC CIRCUIT, AND METHOD FOR PRODUCING A VALUE OR SECURITY DOCUMENT

(71) Applicant: Bundesdruckerei GmbH, Berlin (DE)

(72) Inventors: Jörg Fischer, Berlin (DE); Stefan Trölenberg, Mittenwalde OT Ragow (DE); Markus Tietke, Berlin (DE); Jakob Hille, Berlin (DE); Frank Fritze, Berlin (DE); Olaf Dressel, Wustermark (DE); Manfred Paeschke, Wandlitz (DE)

(73) Assignee: BUNDESDRUCKEREI GmbH, Berlin (DE)

( * ) Notice: Subject to any disclaimer, the term of this patent is extended or adjusted under 35 U.S.C. 154(b) by 0 days.

(21) Appl. No.: 15/555,834

(22) PCT Filed: Feb. 25, 2016

(86) PCT No.: PCT/EP2016/053931
§ 371 (c)(1),
(2) Date: Sep. 5, 2017

(87) PCT Pub. No.: WO2016/139114
PCT Pub. Date: Sep. 9, 2016

(65) Prior Publication Data
US 2018/0039874 A1 Feb. 8, 2018

(30) Foreign Application Priority Data
Mar. 5, 2015 (DE) .................. 10 2015 204 018

(51) Int. Cl.
*G06K 19/073* (2006.01)
*G06K 19/077* (2006.01)
(Continued)

(52) U.S. Cl.
CPC ....... *G06K 19/07309* (2013.01); *B42D 25/29* (2014.10); *B42D 25/40* (2014.10); *G06K 19/077* (2013.01)

(58) Field of Classification Search
None
See application file for complete search history.

(56) References Cited

U.S. PATENT DOCUMENTS 4,892,999 A 1/1990 Wai-Kwan
2005/0240778 A1 10/2005 Saito
(Continued)

FOREIGN PATENT DOCUMENTS

DE 25 12 085 B2 11/1976
DE 2512085 B2 11/1976
(Continued)

*Primary Examiner* — Kristy A Haupt
(74) *Attorney, Agent, or Firm* — Frank J. Bonini, Jr.; John F. A. Earley, III; Harding, Earley, Follmer, Frailey, P.C.

(57) ABSTRACT

In order to provide a document of value or security document 1000 having an electronic circuit 1270 with increased mechanical stability, in particular to bending load, it is proposed to form the document of value or security document 1000 from at least two document layers 1100, 1200, 1300, 1400 arranged in a stack and connected to one another by means of a joining process, wherein the stack is formed by a supporting structure layer 1100 and a circuit carrier layer 1230 carrying the electronic circuit 1270. The supporting structure layer 1100 is formed from a fiber composite material.

18 Claims, 8 Drawing Sheets

(51) Int. Cl.
 *B42D 25/29* (2014.01)
 *B42D 25/40* (2014.01)

(56) References Cited

U.S. PATENT DOCUMENTS

| | | | |
|---|---|---|---|
| 2010/0079970 A1 | 4/2010 | Prest et al. | |
| 2010/0320274 A1* | 12/2010 | Nielsen | G06K 19/0705 |
| | | | 235/492 |
| 2014/0263663 A1 | 9/2014 | Pueschner et al. | |

FOREIGN PATENT DOCUMENTS

| | | |
|---|---|---|
| DE | 196 43 357 A1 | 4/1997 |
| DE | 19643357 A1 | 4/1997 |
| DE | 69529967 | 11/2003 |
| DE | 10 2011 050 794 A1 | 6/2012 |
| DE | 102011050794 A1 | 6/2012 |
| DE | 10 2012 223 472 A1 | 6/2014 |
| DE | 102012223472 A1 | 6/2014 |
| DE | 10 2013 102 003 A1 | 8/2014 |
| DE | 102013102003 A1 | 8/2014 |
| EP | 0 922 720 A1 | 6/1999 |
| EP | 0922720 A1 | 6/1999 |
| WO | WO 2005/104704 | 11/2005 |
| WO | WO2005104704 | 11/2005 |
| WO | WO 2013/103600 A1 | 7/2013 |
| WO | WO2013103600 A1 | 7/2013 |

\* cited by examiner

A-A

B-B

A-A

VALUE OR SECURITY DOCUMENT COMPRISING AN ELECTRONIC CIRCUIT, AND METHOD FOR PRODUCING A VALUE OR SECURITY DOCUMENT

FIELD OF THE INVENTION

The present invention relates to a document of value or security document, in particular an identification document (ID document), for example an identification card (ID card), with an electronic circuit, and to a method for producing a document of value or security document. In particular, the present invention relates to an ID card with a biometric sensor, in particular a fingerprint scanner device, with an electronic display and with an RFID circuit.

PRIOR ART AND BACKGROUND OF THE INVENTION

Security documents or documents of value are used for example for the identification of people and/or objects and/or for cashless payment transactions. They have, inter alia, visually perceptible features, which assign them uniquely to an individual and/or an object and/or a cash account or securities account and which allow only the document owner to identify himself or to have access to the object or the account and for example to perform money transfers. For this reason, these documents must be protected against misuse. To this end, they can have, for example, a fingerprint sensor and a display device, via which the user can authenticate himself for use of the card.

ID documents are usually produced from plastic materials in order to ensure the necessary flexibility thereof. Documents of value or security documents are often produced by laminating a number of partially graphically designed polymer films, for example polycarbonate films, in a hot/cold lamination press in multiple sheet-fed format or also in a continuous lamination process with a plurality of heating and cooling press stations arranged in succession. Electronic component parts contained in the documents are usually mounted on a circuit carrier layer, which are connected together with further document layers to form the laminate.

To this end, DE 10 2013 102 003 A1 for example discloses a chip card with integrated active components which comprises a chip card module carrier and a wiring structure, an integrated circuit and a lighting device, which are all arranged on the chip card module carrier, wherein the integrated circuit, the chip card module antenna, and the lighting device are electrically coupled to the electric wiring structure. In accordance with embodiments described in this document, the carrier can consist for example of epoxy resin, polyimide, or FR4 (glass-fibre matting saturated with epoxy resin).

Document DE 10 2012 223 472 A1 describes a document of value and/or security document which has an antenna structure. In order to produce the document, the antenna structure is applied to a carrier body, which can be formed as a plastic layer, for example made of polyimide. Further, an electronic component can also be arranged on the carrier body, for example a semiconductor component. Furthermore, sub-modules can also be used as chip carrier, based on flexible printed circuit boards (Interposa), for example made of polyimide or FR4.

Document DE 10 2011 050 794 A1 specifies a security document or document of value which comprises at least one card body, made of a number of layers, and at least one display module. The display module has a chip substrate layer, which for example is formed from epoxy resin or polyimide.

THE PROBLEMS ADDRESSED BY THE INVENTION

It has been found that the known documents produced by lamination have the disadvantage that the stability of the documents with an electronic circuit is not sufficient during their use, in particular if the documents have display devices and other exposed circuit components. Furthermore, it is also not ensured in all cases that the electronic components and electrical connections thereof on a circuit carrier are sufficiently protected against mechanical damage.

The problem addressed by the present invention thus lies in overcoming the disadvantages of the known documents of value or security documents and in particular providing documents having increased mechanical stability, particularly against bending load. These documents should also remain dimensionally stable with longer-term use and should have the necessary high rigidity, in particular torsional resistance, and robustness for this purpose, so as to protect the electronic components contained in the documents, for example against breaking and cracking or tearing at the electrical contact points, The previously used polymer materials which are used to produce smartcards for example do not meet these requirements. Furthermore, a structure for documents of value or security documents in the form of multifunctional smartcards should be found that corresponds to standard ISO/DIS 18328-2, which is currently being drafted, with a card thickness of 2.5 mm. The document should also be protected against delamination. The document of value or security document should also be produced easily and economically.

DEFINITIONS

Insofar as terms are used hereinafter in the singular form, for example "electronic circuit", "document layer", "electronic semiconductor component", "aperture", etc., the corresponding plural form can also be understood to be included in each case, specifically "electronic circuits", "document layers", "electronic semiconductor components", "apertures", etc., and vice versa, unless expressly stated otherwise.

Where the term "document of value or security document" is used in the description and in the claims of the present application, this is understood to mean, for example, a personal identification document, a driver's licence, an access identification document or another ID document, for example an ID card, a vehicle registration document, a cheque book, bank card, credit card or cash card, customer card, heath insurance card, a company ID card, proof of authority, membership card, gift card or shopping voucher, or another credential or even another document of value or security document. The document of value or security document can be, in particular, a smart card, if the document is present in card form. The document of value or security document can be present in ID-1, ID-2 or ID-3 format, or in any other standardised or non-standardised format, for example in card form. The format of the document of value or security document is preferably ID-1. The document of value or security document should meet the standardised requirements, for example ISO 10373, ISO/IEC 7810, ISO 14443 and, as appropriate, the standard ISO/DIS 18328-2, which is still at draft stage.

Insofar as the terms "electronic semiconductor component" or "IC" are used in the description and in the claims of the present application, these are to be understood to mean, for example, an unhoused semiconductor chip (bare die) or a housed semiconductor chip, for example in the form of a Surface Mount Device (SMD), a Chip Scale Package (CSP) or one of the following designs: DIP, TQFP, MLF, SOTP, SOT, PLCC, QFN, SSOT, BGA, MOB, or a chip module. If the chip is unhoused, it can be used in a thinned form.

BASIC CONCEPT OF THE INVENTION AND PREFERRED EMBODIMENTS

In accordance with a first aspect of the present invention, the above problems are solved by a document of value or security document, in particular by an ID document, and very particularly by an ID card, which has an electronic circuit.

In accordance with a second aspect of the present invention, the above problems are also solved by a method for producing the document of value or security document comprising the electronic circuit.

The document of value or security document according to the invention, which comprises the electronic circuit, is formed from at least two document layers arranged in a stack and connected to one another by means of a joining process. The stack is formed by a supporting structure layer and a circuit carrier layer carrying the electronic circuit. The supporting structure layer is formed from a fibre composite material, which preferably is unmeltable.

In order to produce the document of value or security document according to the invention, a method is used that comprises the following method steps:
  (a) providing the supporting structure layer and the circuit carrier layer;
  (b) stacking on top of one another the supporting structure layer and the circuit carrier layer carrying the electronic circuit, wherein the supporting structure layer is formed from a fibre composite material which preferably is unmeltable; and
  (c) connecting the supporting structure layer and the circuit carrier layer using a joining process.

An unmeltable material is to be understood in the present case to mean that the material cannot melt without decomposing. The material therefore cannot transition into a liquid state without changing its chemical composition, although the material can have a glass transition temperature at which the material transitions from a brittle glass state into a soft rubber-elastic state.

Since a composite material is used for a supporting structure layer on which there is no electronic circuit disposed and which can be integrated into the document of value or security document, it is ensured that the document is protected against twisting and bending, even with prolonged use. In particular, there are no signs of fatigue of the material, which would lead to a deformation under material load. Even thermal influences do not reduce the dimensional stability of the document, in contrast to documents constructed in the conventional manner. By way of example, the document can therefore be placed on an uneven substrate under intense solar radiation and can be left there over a relatively long period of time without sustaining any damage. The high torsional resistance and robustness of the document is attained by the monocoque structure thereof, that is to say by the incorporation of the supporting structure layer in the overall structure. This results in protection of the electronic components against damage or even breakage. The document cannot be delaminated and can be easily produced.

The fibre composite material can be formed in particular with a non-thermoplastic matrix material, preferably with a thermoset matrix material, very particularly preferably with a polymer material. The polymer material by way of example can be produced on the basis of a bifunctional or higher functional epoxy resin, in particular on the basis of bisphenol A, or a mixture of an epoxy resin with a bismaleimide/triazine resin. The latter is described by way of example in DE 25 12 085 B2. Alternatively, a phenol resin can also be provided, including phenol resins of the Novolak type, also in the form of polyimide or a fluorinated polymer, such as a polymer made from tetrafluoroethylene, which for example is known under the name Teflon® (trademark of DuPont, USA).

The fibre material of the fibre composite material is preferably formed by glass fibres. Alternatively, fibres formed from other materials, such as quartz, aramide, carbon (carbon fibres, for example carbon fibre reinforced plastic (CFRP)), stretched polymer fibres, for example polyester fibres, and the like can also be used. The fibres can be contained in unordered form in the composite material, for example by saturating a fibre felt together with the matrix material and curing the latter. Alternatively, the fibres can also be added to the matrix material in separated form, before said material is then cured. The fibres are advantageously present in the matrix material in the form of a fabric, for example in the form of fabric mats, in particular glass-fabric mats, which are saturated with the matrix material before this is then cured.

In a preferred development of the present invention, the fibre composite material of the supporting structure layer is formed from a thermoset, for example epoxy resin-based, reinforced with glass fibre fabric. Materials of this type are extremely resistant to chemical, mechanical, and thermal influences due to their properties. In particular, the mechanical stability, for example dimensional stability against bending load, is excellent in materials of this type on account of the combination of an unmeltable material by selection of a thermoset and the embedding of a glass fibre fabric in the polymer material.

FR4, FR5 and FR5/BT material can be used as particularly preferred materials. FR4 is produced from glass fibre fabric mats saturated with bifunctional epoxy resin. FR5 material differs here from by the use of higher-functional epoxy resins (tetra-, multifunctional resins). FR5/BT material additionally contains bismaleimide/triazine resin. The $T_g$ points (glass transition temperature) of these materials increase in the order $T_g(FR4)<T_g(FR5)<T_g(FR5/BT)$. By use of FR5 or even FR5/BT, a higher thermal resistance can be achieved.

In accordance with a preferred development of the present invention, the circuit carrier layer is also formed from a fibre composite material which preferably is formed with a polymer, which particularly preferably is unmeltable, as matrix material. With regard to the material from which the circuit carrier layer is formed, reference is made to the above comments regarding the material for the supporting structure layer, since the material of the circuit carrier layer can be selected from the same group of materials from which the supporting structure layer is also formed. It is particularly advantageous to produce both the supporting structure layer and the circuit carrier plate from the same material, since a good compatibility between both layers can thus be achieved on account of identical coefficients of thermal expansion.

This leads to superior mechanical properties of the document. By way of example, both the supporting structure layer and the circuit carrier layer can be formed from FR4 material. The circuit carrier layer can thus be so thin that it can be bent (film-like) and for example can have a thickness in the range of from 50 μm to 500 μm (flexible printed circuit board).

The circuit carrier layer carries the electronic circuit, in that said electronic circuit is produced on the circuit carrier layer, for example using conventional methods for producing conductor tracks and mounting electronic components on a carrier and electrically connecting the electronic components to the conductor tracks in accordance with the desired circuit layout. To this end, copper conductor tracks by way of example are chemically deposited on the surfaces of the circuit carrier layer using chemical methods, or conductor tracks are produced from a conductive paste, for example with silver particles contained therein, on the circuit carrier layer using a printing method. The electronic components are preferably fixed on the circuit carrier layer by means of an adhesive, and electrical connections of the contact faces of the components to the conductor tracks are then produced by means of a conventional soldering method. To this end, before the soldering process is performed, a solder stop mask can be applied to the surface of the circuit carrier layer to be equipped with the components. By producing the electronic circuit on the circuit carrier layer, a circuit layer is formed. The circuit carrier layers are typically firstly provided in a multiple-up format with the conductor tracks and, as applicable, the solder stop mask, whereupon the circuit carrier layers are divided into a one-up format and are equipped with the electronic components and for this purpose are subjected to a soldering process. When being divided into the one-up format, for example by means of a punching process, the two-dimensional form of the circuit carrier layer can be produced.

In accordance with a further preferred development of the present invention, the supporting structure layer has a recess, at least on one side, in order to receive the circuit carrier layer, with the electronic circuit carried thereon, in an accurately fitting, that is to say play-free, manner. This recess for this purpose preferably occupies almost the entire area of the supporting structure layer on this side, preferably at least 80%, more preferably at least 85%, even more preferably at least 90%, and most preferably at least 92.5%. The recess preferably occupies at most 99%, more preferably at most 98%, and most preferably at most 97.5% of the area of the supporting structure layer. The recess is preferably delimited/defined on this side by an outer peripheral ridge of the supporting structure layer. Apart from any apertures provided as necessary in the supporting structure layer, the recess is preferably of constant depth over its entire area.

The form of the supporting structure layer formed by the recess can be described in this embodiment also by the ridge running around the outer layer edge, preferably with rectangular cross-section, corresponding to a stepped increase of the thickness of the layer in the region of the ridge, in that this ridge delimits the recess peripherally.

The recess preferably has a substantially rectangular form, optionally with rounded edges, and, in a particularly preferred embodiment, has a form similar to the form of the supporting structure layer, in that for example the peripheral ridge delimiting the recess is of uniform width over all edges or at least over three edges of the layer.

The depth of the recess in the supporting structure layer is preferably exactly the same size as the thickness of the circuit carrier layer, so that this can be fitted into the recess when these two layers are brought together so that it terminates flush with the upper side of the peripheral ridge defining the recess.

The outer form and the dimensions of the circuit carrier layer are preferably additionally precisely adapted to the form and the dimensions of the recess, so that the circuit (carrier) layer can be fitted into the recess without play when inserted.

In a further preferred development of the present invention, the supporting structure layer can also have, in addition to this (first) recess on a first side of the layer, a second recess on a second side of the layer. That which has been described above for the first recess applies accordingly for the second recess. The second recess can have the same form and the same dimensions as the first recess. The depth of the second recess can be based on a further document layer, in such a way that this further document layer again terminates flush with the upper side of the ridge on the second side after being inserted into the second recess. The form and the dimensions of the further document layer can be adapted to the form and the dimensions of the second recess, as is also the case with the circuit carrier layer, so that this further document layer can be inserted into the second recess with an accurate fit, i.e. without play.

In a further preferred development of the present invention, at least one electronic semiconductor component and/or at least one display device and/or at least one biometric sensor is arranged on at least one side of the circuit carrier layer. The supporting structure layer in this case preferably has at least one aperture, wherein the at least one electronic semiconductor component, the at least one display device and/or the at least one biometric sensor and/or even another electronic component is received in an assembled state by a corresponding aperture in the supporting structure layer. This at least one aperture is arranged within the first recess. These electronic components are thus protected against a breaking or cracking or tearing of their electrical contacts when the document is subjected to a mechanical load. In this case, use is made of the fact that the apertures are larger than the electronic components, so that the components in the assembled state of the supporting structure layer with the circuit layer are distanced from the aperture walls and cavities are provided between the components and the aperture walls. For the aforementioned purpose, the thickness of the supporting structure layer in the region of the apertures is preferably at least the same size as the height of the components rising above the circuit carrier layer, so that the components at most terminate flush with the outer face of the supporting structure layer on the side opposite the circuit layer, but do not protrude there beyond. Effective protection of the components against mechanical damage is thus provided. The supporting structure layer in this case acts as a compensation layer, which compensates for unevennesses, which otherwise would be formed by the electronic components, i.e. serves for height adjustment.

In a further preferred development of the present invention, this at least one cavity, which is formed by the at least one aperture and the at least one electronic component received by the aperture, is filled with a polymer material once the circuit carrier layer has been brought together with the supporting structure layer. This polymer material cross-links during the assembly process and forms a casing around the electronic components within the document. This polymer material is preferably resilient after the cross-linking, so that it can absorb and dissipate shear and compressive forces. Alternatively, a further document layer can also be arranged as flow layer on the side of the supporting structure layer facing away from the electronic circuit carrier layer, the thermal properties of said further document layer being designed so that this layer, with the assembly of the document, in particular with a thermal treatment step, for example for curing a reactive adhesive, softens, flows into the cavities, and in so doing fills the cavities. To this end, the softening point of the polymer material of this flow layer is to be selected to be low enough that the material softens at the used joining temperature and flows into the cavities. The polymer material filling the cavities or the material of the flow layer is preferably transparent so as to ensure that a display device encased by the material remains visible from the outside.

In a further preferred development of the present invention, the document of value or security document according to the invention is additionally formed by at least one further document layer. This at least one further document layer can be formed from a polymer selected from a group comprising polycarbonate (PC), in particular bisphenol A-polycarbonate, polyethylene terephthalate (PET), derivatives thereof, such as glycol-modified PET (PETG), polyethylene naphthalate (PEN), polyvinylchloride (PVC), polyvinylbutyral (PVB), polymethylmethacrylate (PMMA), polyimide (PI), polyvinyl alcohol (PVA), polystyrene (PS), polyvinylphenol (PVP), polypropylene (PP), polyethylene (PE), thermoplastic elastomers (TPE), in particular thermoplastic polyurethane (TPU), acrylonitrile butadiene-styrene copolymer (ABS) and derivatives thereof, or paper or cardboard or glass or metal or ceramic. Further document layers made from a number of these materials can also be used. The further documents layers preferably consist of PC or PC/TPU/PC. The polymers can be either filled or unfilled. In the latter case, they are preferably transparent or translucent. If the polymers are filled, they are opaque. These further document layers can also carry printed layers, for example a security print. In principle, it is also possible that the supporting structure layer and the circuit carrier layer are also formed from one of the aforementioned materials, wherein the material of the supporting structure layer, however, is formed in accordance with the invention as a composite material, and the material of both layers still preferably is unmeltable.

In a further preferred development of the present invention, the supporting structure layer has, at least on the second side, the second recess for receiving a further document layer in the form of a cover layer in an accurately fitting manner, i.e. without play. The document of value or security document in this development therefore has the cover layer on the side of the supporting structure layer opposite the circuit layer. The cover layer preferably serves to protect the electronic components against external influences. Further, the cover layer can also visually shield the supporting structure layer. For this purpose, the cover layer is preferably opaque and/or also preferably has a security print. The cover layer can be formed by a polymer film that is coloured opaque with pigment. The cover layer can be formed by a laminate formed from a number of individual layers of polymer films made from the same or different polymers.

The cover layer can comprise one or more apertures, for example in order to enable touching of a biometric sensor, for example a fingerprint scanner device, from the front side of the document. The security print of the cover layer and/or an opaque inner layer can also be interrupted in regions, so that a viewing window is formed, so that for example a display device arranged there behind is visible from the outside. This of course presupposes that the material of the cover layer is transparent per se or at least translucent, and the cover layer is opaque only as a result of the security print.

In yet a further preferred development of the present invention, the document of value or security document has yet a further document layer in the form of a termination layer on the side of the circuit layer opposite the supporting structure layer. The termination layer is therefore disposed on the side of the document that is opposite the side on which the cover layer is disposed. The termination layer is preferably dyed or pigmented opaque, for example filled with pigments, similarly to the cover layer, and in this way visually shields the rear side of the circuit layer. Alternatively or additionally, the termination layer can comprise a print layer. In this case, the material of the termination layer can be transparent or translucent. The termination layer, similarly to the cover layer, serves primarily to protect the electronic components within the document against external influences. The termination layer can also be formed either by a polymer film or a laminate formed of a number of polymer films, wherein the polymer films in the latter case can be produced from the same polymer or from different polymers.

The form and the dimensions both of the cover layer and of the termination layer can be designed, for the case in which the supporting structure layer has one or two of the described recesses, so that these layers can be fitted into the corresponding recess preferably without play. In the case of the termination layer, this of course presupposes that the circuit layer does not terminate flush with the outer side of the ridge, but is set back in relation thereto and the termination layer can still be inserted into the recess.

The imprint on the cover layer and/or the termination layer is preferably disposed on the inwardly pointing side of the layer, so that it is protected against mechanical damage, such as abrasion. The imprint of the cover layer and/or the termination layer can serve to provide a coloured personalisation of the document of value or security document. By way of example, one layer or both layers can be imprinted with personalising information of the document owner, for example with a facial image of the document owner, with data relating to the owner in alphanumerical form, such as the name, date and place of birth, address, and the like, and/or the signature of the owner. Instead of the personalising print or additionally thereto, a non-individualising imprint can also be printed onto the layer(s). These security prints are preferably applied to the inwardly pointing faces.

In addition to the cover layer and the termination layer, further outer layers can also be provided, which then preferably also extend over the ridges of the supporting structure layer and cover these outwardly. In this case, these further outer document layers have an imprint as necessary, instead of the cover and/or termination layers covered by said further outer document layers. However, these further document layers can also be formed merely as transparent or translucent layers, through which the imprint of the cover and/or termination layers remains visible from the outside.

In a further preferred development of the present invention, the electronic circuit comprises an RFID circuit with an RFID IC (integrated circuit), which is an electronic semiconductor component, and an RFID antenna, a fingerprint scanner device, which likewise contains an electronic semiconductor component, and a display device, which likewise can contain at least one electronic semiconductor component. In addition, the electronic circuit can contain further electronic components, for example a central processor. Alternatively to the RFID circuit or additionally thereto, the circuit layer can also carry an IC module provided with contact faces exposed on an outer side of the document. The circuit carrier layer can be formed with one or more conductor track levels as printed circuit. As a result of the integration of the RFID circuit, contactless communication of the document of value or security document with an external writing/reading device is possible.

The document of value or security document preferably does not have a power source, for example a battery. It is thus ensured that the document can be kept ready for use over a very long period of time. This is because the use of the battery limits the period of usability of the document to one or two years. The electrical energy necessary for the operation of the electronic components, in particular the display device, can be fed from a writing/reading device via the RFID antenna of the document.

The RFID antenna can be formed by a number of coil-like turns, which for example are arranged in a single circuit level. By way of example, the turns of the antenna are printed onto the circuit carrier layer. The RFID IC is connected to the turns of the antenna. The turns of the antenna can be printed for example onto the circuit carrier layer. This printing process can be performed using a relevant known printing technique constituted by through-printing, gravure printing, relief printing and flat printing or digital printing. In accordance with one embodiment of the invention, the antenna is coiled and is arranged in an edge region of the document. Here, the turns of the antenna are arranged peripherally along the edge of the document, that is to say the individual turns are arranged adjacently. By way of example, the antenna is formed with a printed-on paste, which contains conductive particles, in particular with a silver conductive paste, or another conductive material, for example a conductive polymer.

The RFID IC can be provided as an unhoused or housed chip in one of the above-mentioned designs. If the RFID IC is provided as an unhoused chip, it can be mounted on the circuit carrier layer by flip chip adhesive bond technology and connected to the antenna. By way of example, it can be electrically and mechanically connected to the antenna in the known manner via an anisotropically conductive adhesive and by means of a collapsed solder. The RFID IC has a memory, into which preferably individualising, particularly preferably personalising information can be written. By way of example, biometric information of the document owner, such as a facial image, fingerprints, specimen signature, also the name, date of birth, address and the like, can be written in.

The display device has a display element that serves for visual representation in particular of the personalised data. The display device can preferably be embodied in a bistable manner, so that it retains its information in the currentless state. Displays of this type are preferably formed as electrophoretic, ferroelectric or cholesteric liquid-crystal displays. The display element can also be formed by a passive or active, self-lighting display system on the basis of OLED elements. In the case of active OLED elements, the display is activated with the aid of a reader or via an installed power source, whereby the presentation is then visually recognisable. The display element is preferably operated via a display driver IC. The display device can be mounted on a separate display carrier, which is in turn mounted on the circuit carrier layer. The display device preferably has contact points at the edge, via which the display device is electrically connected to the conductor tracks on the circuit carrier layer.

The fingerprint scanner device can also be electrically connected to a central processing processor IC, which controls this and on which encryption algorithms can be stored. The central processor IC is preferably electrically connected to the display device.

In a further preferred development of the present invention, the joining process for connecting at least the supporting structure layer to the circuit (carrier) layer is an adhesive bonding process. The supporting structure layer and the circuit layer are for this purpose connected to one another preferably by means of a latent-reactive adhesive, for example by means of a thermal treatment process. Latent-reactive adhesives are known per se in many forms. In this regard, reference is made for example to EP 0 922 720 A1. The adhesives are typically polyisocyanate particles, for example in a dispersion, which are surface-deactivated. Such a dispersion can contain substances that are reactive with the polyisocyanate, such as low-molecular di-, tri-, or polyols, or polymeric di-, tri- or polyols. A layer made of such an adhesive can already have adhesive properties, without further treatment. It is essential, however, that the isocyanate is activated again when the layer is heated above a reaction temperature and is reacted with other functional groups in the adhesive, but in particular also in polymers, with which the adhesive is in contact, and thus forms an integrally bonded connection that cannot be detached readily. Alternatively, the circuit (carrier) layer can be connected to the supporting structure layer by means of isocyanate adhesive.

If the document of value or security document is also formed by further layers, such as the cover layer and the termination layer, these can be assembled with the supporting structure layer and the circuit layer and are also joined together by means of an adhesive process to form the document. In order to carry out the adhesive process, a thermally activatable latent-reactive adhesive of this type is preferably used. The joining process can preferably be carried out in a lamination device, once the individual layers have been combined in a stack. The lamination device can be a conventional hot/cold lamination press, which enables either operation in a batch process or continuous process.

In a further preferred development of the present invention, the circuit carrier layer has apertures which allow a passage of adhesive. The latent-reactive adhesive in the apertures can thus connect further layers, such as the cover layer or the termination layer, additionally directly to the supporting structure layer. This ensures a further improved adhesive strength of the overall structure.

The assembled and joined document of value or security document contains the above-described document layers in the joined state, wherein layers adjacent to one another might no longer be discernible as such if connected to one another without any adhesive and if they consist of the same material, but instead might appear as a monolithic layer block. However, this is only true for layers that are formed from a thermoplastic material and that are fused together in a lamination step. Otherwise, the layers can be visible separately from one another, i.e. separated from one another, at least when the document is cut through. There are preferably no cavities present between the layers and in the surrounding environment of the electronic components. Cavities originally present are preferably filled during the joining process by the materials joined to one another. Cavities originally present in the surrounding environment of the electronic components can be filled with a polymer material used additionally to the document layers, which polymer material likewise is separately discernible when the document is cut through. If the supporting structure layer has one or two recesses for receiving the circuit layer and, as appropriate, a cover layer, the ridges delimiting the recesses can be discernible from outside as separate edge regions. However, this presupposes that they are not hidden by further document layers.

In a further development of the present invention, injection moulding is used as the joining process (low-pressure injection moulding or high-pressure injection moulding). To this end, the circuit layer and the supporting structure layer are placed in a mould. The two layers can be glued to one another beforehand in order to better connect them to one another. The supporting structure layer and the circuit (carrier) layer are then completely engulfed by polymer material. By way of example, protecting cover and termination layers are thus formed. In the case of conventional injection moulding, high pressures of from 100 to 1000 bar are usually used.

Conventional materials for injection moulding are polyamide (PA), polyether ether ketone (PEEK), polyethylene (PE), polyamide imide (PAI), acrylonitrile-butadiene-styrene copolymer (ABS), polycarbonate (PC), polyoxymethylene (POM), polybutylene terephthalate (PBT), polypropylene (PP), thermoplastic polyurethane (TPU), polyacrylic acid (PAA), polyphthalamide (PPA), polystyrene (PS), thermoplastic elastomers (TPE), polyetherimide (PEI), polyethersulfone (PES), polysulfone (PSU), styrene-acrylonitrile copolymer (SAN), polymethylmethacrylate (PMMA), polyphenylene oxide (PPO), polyphenylene sulfide (PPS), polyphenylene sulfone (PPSU), and polyethylene terephthalate (PET).

In the case of low-pressure injection moulding, lower pressures of from 5 to 40 bar are used. In this hot-melt moulding method, hot-melt adhesives are used. The advantage here lies in the fact that the lower pressure causes less damage to electronic components. Alternatively, a casting method with two-component casting compounds can also be used. These have the advantage that a renewed heating cannot soften the plastic again. Manipulation of the ID document is thus hindered.

A graphical design and personalisation of the document can be provided by optional final printing, for example by means of inkjet digital printing or in a re-transfer or thermal transfer printing process, both if, as described further above, the document is produced from individual films by means of a lamination process, and if the document is produced by means of the above-described high-pressure or low-pressure injection moulding process. In this case, an external imprint can be protected by a subsequently applied protective lacquer or a protective film. Otherwise, insertion of the graphically designed cover and termination layers can be considered for a graphical design of the outer sides of the document, which layers, as described further above, are arranged above and below the stack formed of supporting structure layer and circuit layer in the layer stack to be laminated.

The document of value or security document according to the invention, in addition to the described security elements and features, can have further security features, which either are individualising or not individualising. Coloured fibres, guilloches, watermarks, embossments, security threats, micro text, tilt-effect pictures, holograms, optically variable pigments, luminescent dyes, see-through registers, and the like can be considered as further security features.

The drawings described hereinafter, which illustrate the invention merely in an exemplary manner with exemplary embodiments, serve to explain the present invention in greater detail.

Figure 1A:
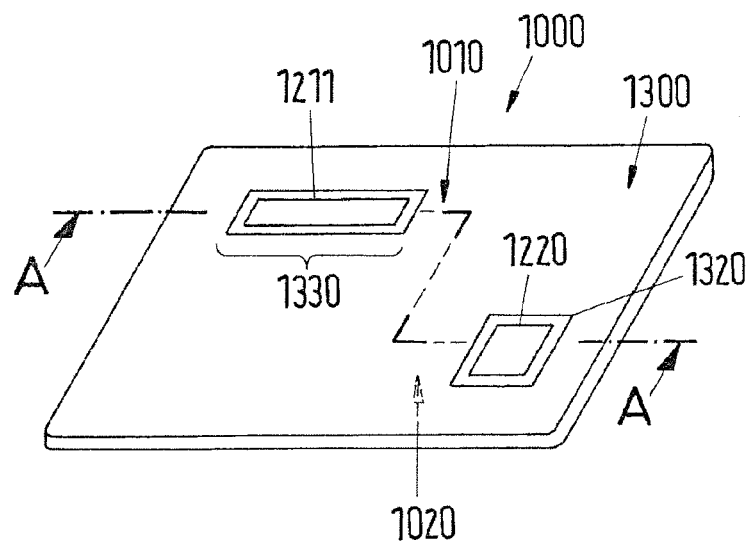
FIG. 1 shows isometric illustrations of a document of value or security document according to the invention; (A) in a first embodiment; (B) in a second embodiment.

Like reference signs in the drawings denote like elements or elements having the same function. The drawings do not always show the parts to scale. Further, the proportions of individual elements in relation to those of others shown within the same drawing or in different drawings also are not always illustrated to scale.

Where an ID card 1000 is described hereinafter, this description relates to any document of value or security document accordingly.

Figure 1B:
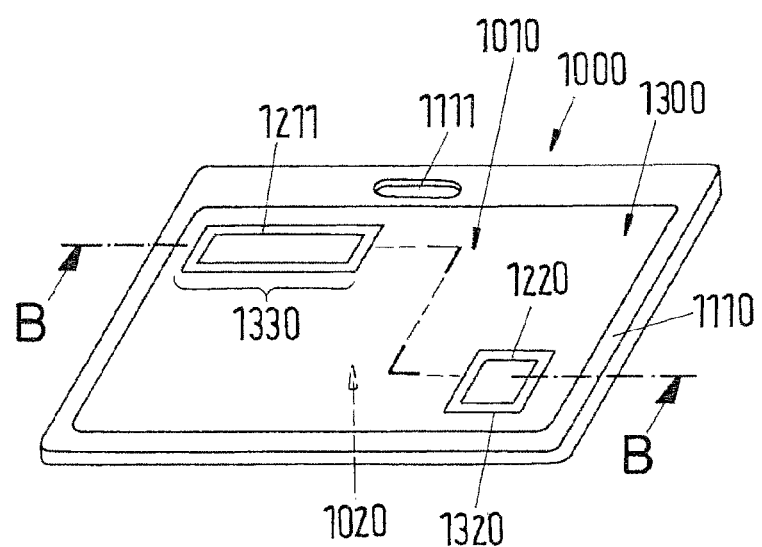
Figure 2:
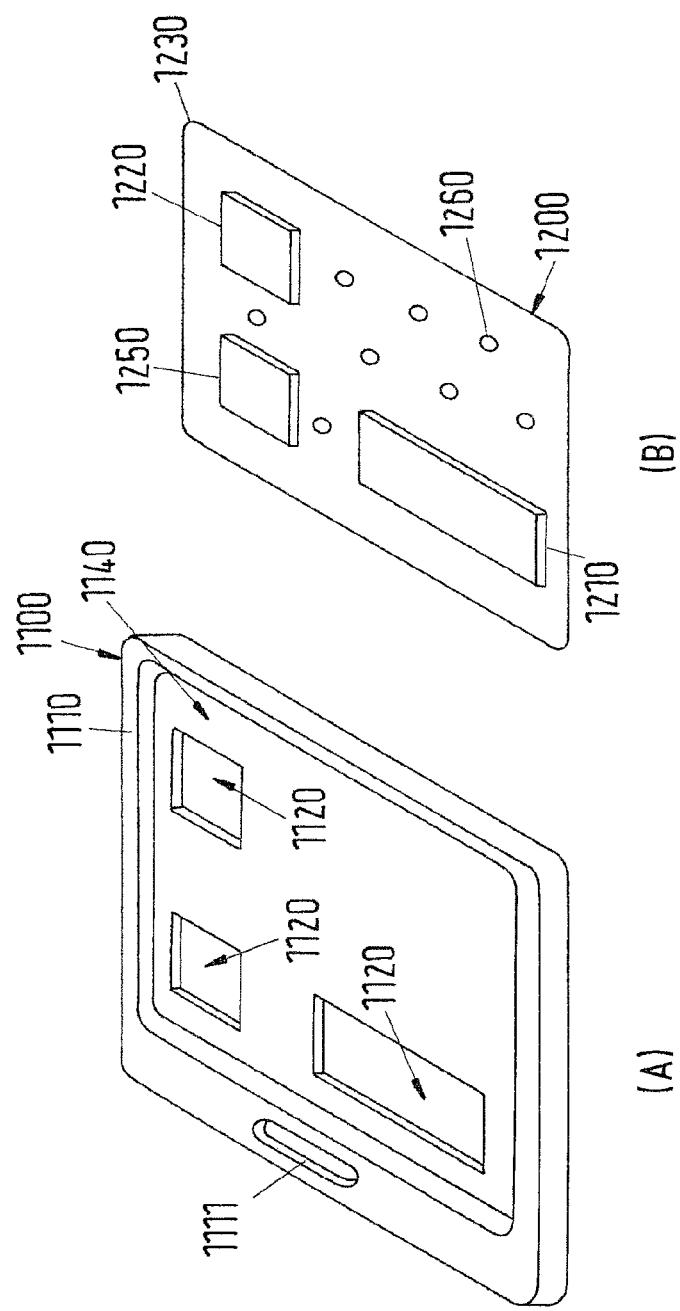
FIG. 2 shows isometric illustrations (A) of the supporting structure layer and (B) of the circuit layer in accordance with the second embodiment.
Figure 3:
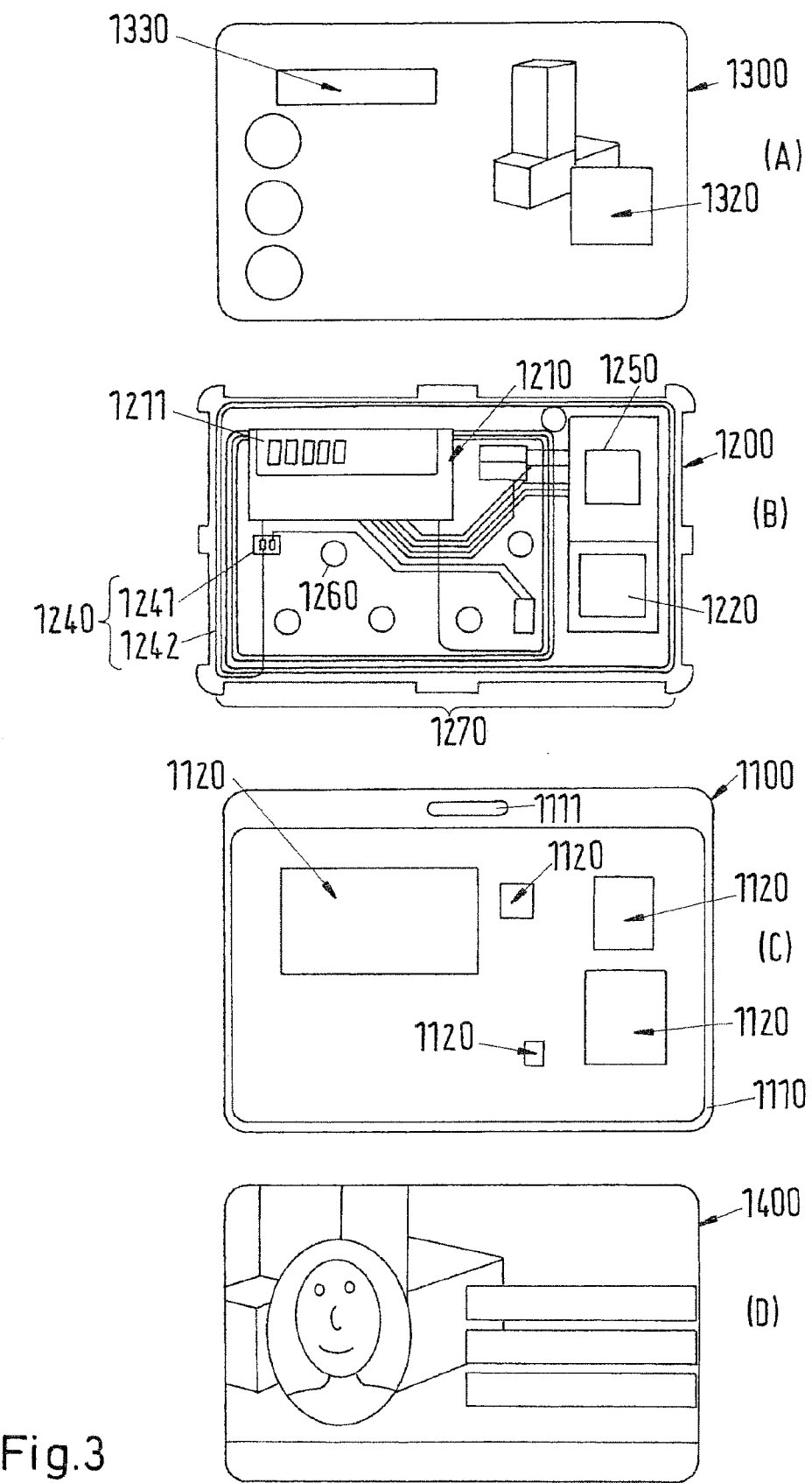
FIG. 3 shows views of document layers of the document of value or security document according to the invention in the second embodiment; (A) cover layer; (B) circuit layer; (C) supporting structure layer; (D) termination layer.

The ID cards 1000 illustrated in FIGS. 1A and 1B have at least one display element 1211 of a display device 1210 (FIG. 3B) and a biometric sensor 1220, for example in the form of a fingerprint scanner device. An RFID circuit 1240 (FIG. 3B), consisting of an RFID IC 1241 and an RFID antenna 1242, is not visible from the outside. In addition, further circuit parts and components are arranged beneath the uppermost cover layer 1300, for example a central processor 1250, and are not visible from the outside. All electronic components and conductor tracks together form an electronic circuit 1270 (FIG. 3B). Although FIGS. 2 and 3 show the individual document layers for the production of the ID card in the second embodiment (FIG. 1B), the embodiment of the circuit layer 1200 shown in these drawings also applies for the first and the third embodiment shown in FIG. 8.

Figure 4:
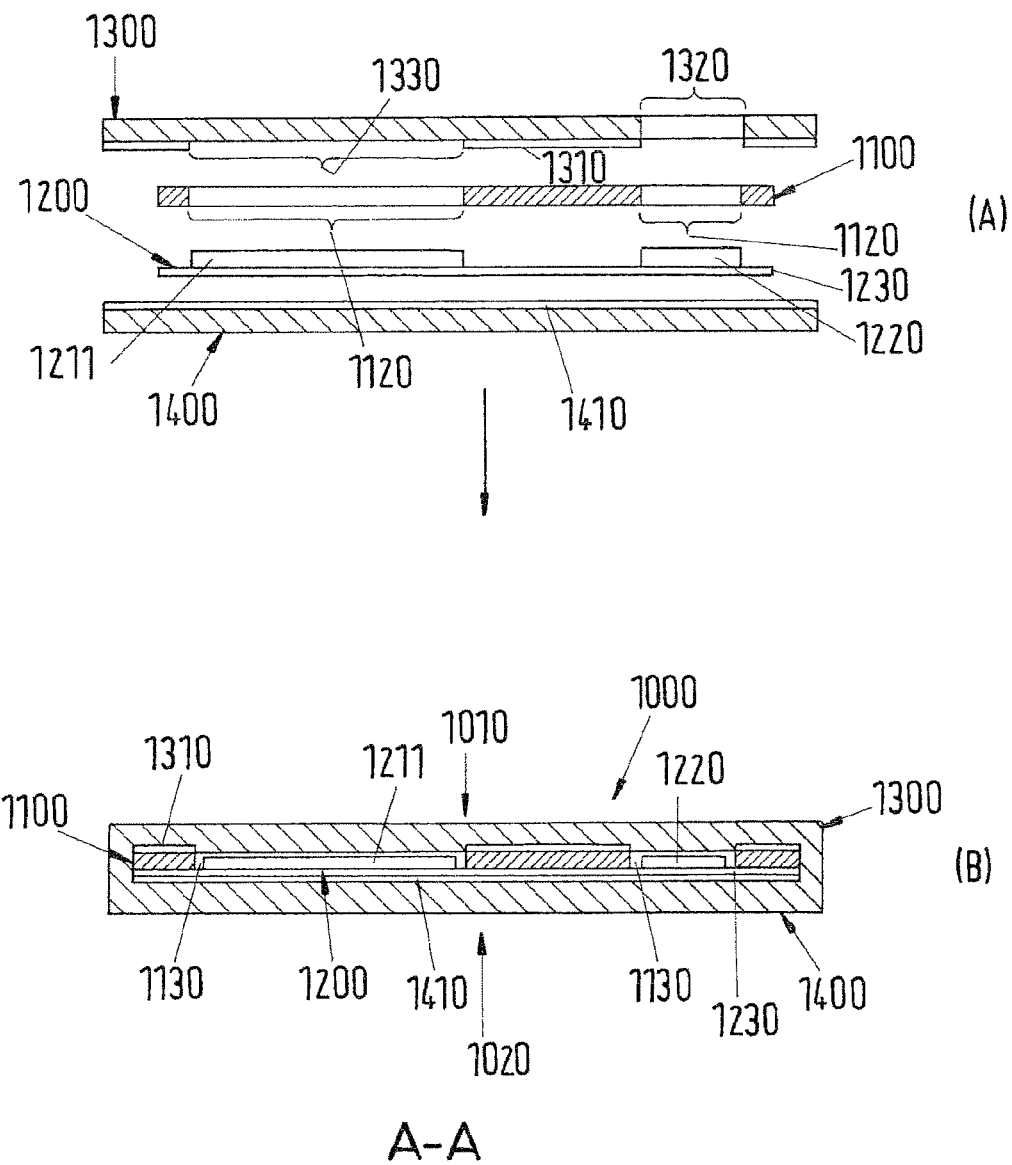
FIG. 4 shows sectional views A—A (see FIG. 1A) of a document of value or security document according to the invention in the first embodiment, produced in a first method variant; (A) before the assembly and joining; (B) after the assembly and joining.

A first embodiment of the ID card 1000 according to the invention in the assembled and joined state is illustrated in FIGS. 1A and 4B, wherein the two method steps according to FIGS. 4A and 4B show the production in a first method variant. In FIG. 4A, the document layers 1100, 1200, 1300, 1400 are shown in the state not yet assembled. The document layers are formed in this first method variant by layer material. In this embodiment, merely the cover layer 1300 arranged at the top is visible (FIG. 4) from the upper side of the card shown in FIG. 1A, and hides all other document layers beneath it. This is because the cover layer has an imprint 1310, for example in the form of a security print, on the inwardly pointing surface, which imprint outwardly visually shields the structures of the card disposed there beneath. Alternatively the cover layer can also be dyed or pigmented, for example by means of pigments, and therefore can be opaque. The security print by way of example can contain individualising marks, in particular personalising marks, for example a facial image in the form of a photo of the card owner, and/or information provided in alphanumerical format, for example the name, date of birth, place of birth and/or the address of the card owner and/or a card serial number, and/or optionally non-individualising marks, for example a guilloche print, logos, emblems, seals, crests, motifs, and the like. An aperture 1320 is introduced into the cover layer, through which aperture the biometric sensor 1220 is exposed outwardly and therefore can be touched for use of the card. The imprint is also interrupted in the region 1330. So that the display element 1211 is visible from the outside through this viewing window from the outside, the cover layer is formed from a transparent material, for example from transparent polycarbonate. If the cover layer is dyed or pigmented and therefore also is already opaque without imprint, it must have an aperture in the region of the display element so that this is visible from the outside.

The supporting structure layer 1100 disposed beneath the cover layer 1300 from an upper visible side 1010 of the ID card 1000 is preferably produced from FR4 material. However, another composite material can also be used. The supporting structure layer has apertures 1120 in the region of the electronic components 1210, 1220, 1250 (FIG. 2A), which apertures for example are introduced into the layer by means of a punching method. The components protrude into the apertures following the assembly of the circuit layer 1200 with the supporting structure layer. The thickness of the supporting structure layer preferably corresponds approximately to the height of the components above the circuit carrier layer 1230, so that the components terminate approximately flush with the surface of the supporting structure layer lying opposite the circuit layer. In any case, the components should not protrude beyond this surface, so that they are disposed completely within the apertures. Any cavities 1130 which are formed in the assembled state between the electronic components and the supporting structure layer because the apertures are larger than the components can be filled with a polymer following the assembly of these two document layers, for example with a thermoplastic polymer (not illustrated). Or, the cavities are filled with the adhesive used to join the document layers. As a result of this structure, the electronic components are protected against external mechanical influences.

The circuit carrier layer 1230 is preferably produced from FR4 material, similarly to the supporting structure layer 1100, but can also consist of a different composite material. Together with the electronic circuit 1270, it forms the circuit layer 1200. The circuit carrier layer has apertures 1260, which can be produced by means of a punching process. Apertures of this type are shown for the second embodiment of the ID card 1000 in FIG. 2B, in which the circuit layer 1200 provided for this purpose is shown. However, these apertures are preferably also disposed in the circuit carrier layer of the first embodiment. They serve to directly connect a termination layer 1400 to the circuit carrier layer via the adhesive applied to the supporting structure layer.

The cover layer 1300 terminates the layer stack formed of supporting structure layer 1100 and circuit layer 1200 towards the upper visible side 1010 of the ID card 1000. The supporting structure layer and the circuit layer are terminated by the termination layer 1400 towards a lower visible side 1020. The termination layer, similarly to the cover layer, is preferably opaque and for this purpose has an imprint 1410, for example a security print, on a surface pointing towards the card interior, so that the structures of the card lying behind the imprint are hidden. In this case, the termination layer can be formed from a transparent polymer material, for example from transparent polycarbonate. Alternatively, the termination layer can also be produced from an opaque material. With regard to the type of the security print, that said with regard to the cover layer also applies to the termination layer accordingly.

The cover layer 1300 and the termination layer 1400 are larger than the supporting structure layer 1100 and the circuit layer 1200. The materials of the cover layer and of the termination layer can thus bear against one another at the edge and fuse with one another at the edge during the joining process. The supporting structure layer and the circuit layer are thus enclosed between these two outer layers and are therefore protected against manipulation and mechanical and other influences.

In order to join the individual document layers 1100, 1200, 1300, 1400 to one another, an adhesive can be used, by means of which document layers bearing against one another can be glued to one another. For this purpose, a latent-reactive adhesive is preferably used. The adhesive is applied flat for example to both surfaces of the supporting structure layer 1100 and the surface of the termination layer 1400 pointing towards the card interior.

Following the assembly of the cover layer 1300 and the supporting structure layer 1100, which is provided on both sides with the adhesive, and also the circuit layer 1200 and the termination layer 1400, the layers are joined to one another. For this purpose, a conventional lamination process can be used, in which the document layers are glued to one another under the action of heat and application of flat pressure. The surfaces of the cover layer and of the termination layer coming into direct contact with one another at the edge can potentially melt under the applied lamination conditions, so that a monolithic connection is produced between these two layers and a boundary between the two layers is no longer discernible after the joining process, still by the previously applied adhesive, if the two layers are formed by the same material.

Figure 6:
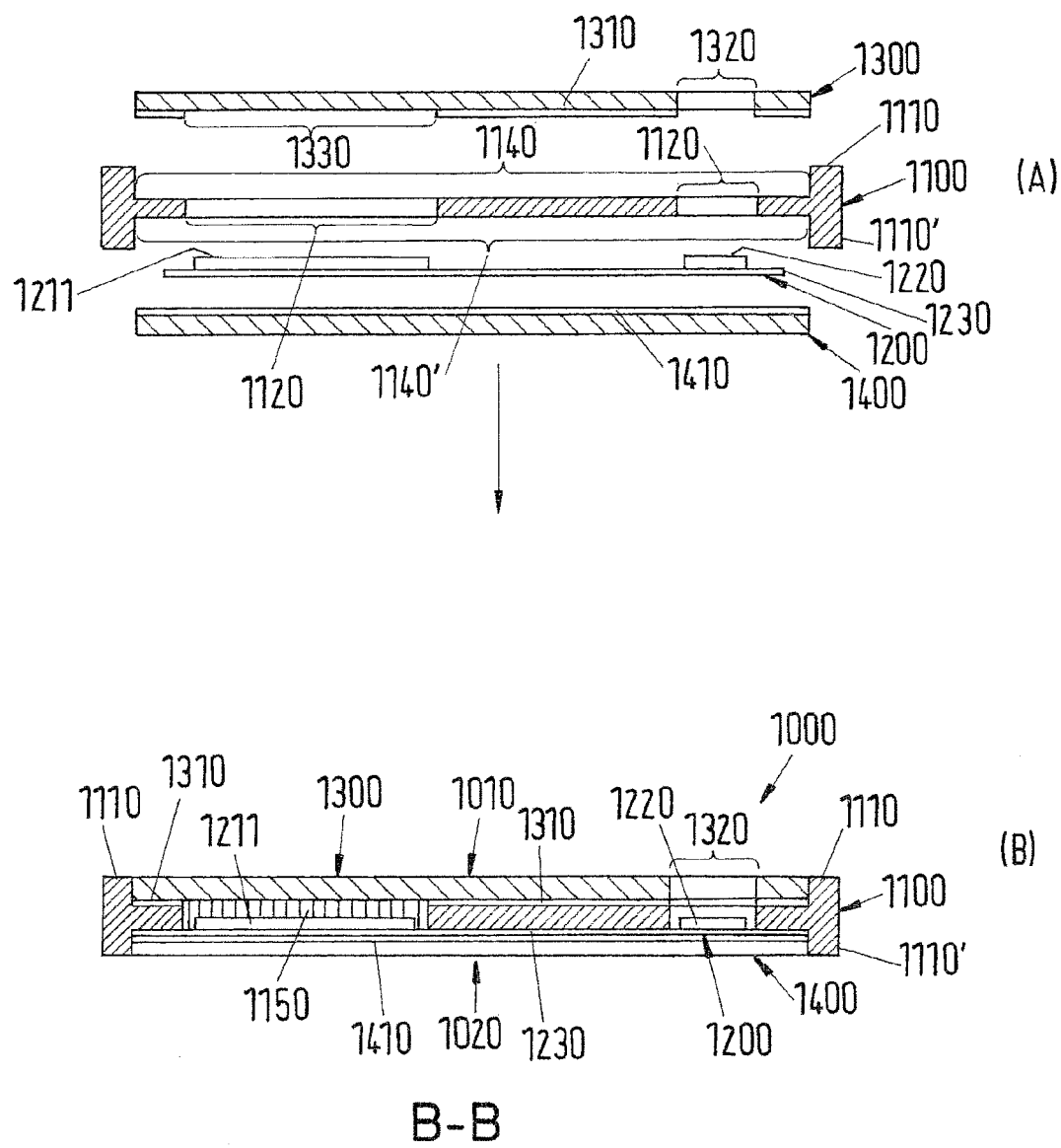
FIG. 6 shows sectional views B—B (see FIG. 1B) of a document of value or security document according to the invention in the second embodiment, produced in the first method variant; (A) before the assembly and joining; (B) after the assembly and joining.

FIGS. 1B and 6B show a second embodiment of the ID card 1000 in the assembled and joined state (FIG. 6A). In FIGS. 2A, 2B and 6A the document layers 1100, 1200, 1300, 1400 are shown in the state not yet assembled and joined. In this embodiment, the inner supporting structure layer 1100 can be identified from the outside via its outer peripheral upper ridge 1110 and lower ridge 1110'. Otherwise, similarly to the first embodiment (FIG. 1A), merely the cover layer 1300 is visible from the upper side of the card shown in FIG.

1B, which cover layer hides all other document layers in the electronic circuit there beneath. This is because, similarly to the first embodiment, the cover layer has an imprint 1310, for example in the form of a security print, on the inwardly pointing surface, which imprint outwardly visually shields the structures of the card disposed there beneath. Alternatively, the cover layer can also be dyed or pigmented, for example by means of pigments, and therefore can be opaque. The security print by way of example can contain individualising marks, in particular personalising marks, for example a facial image in the form of a photo of the card owner, and/or information provided in alphanumerical format, for example the name, date of birth, place of birth and/or the address of the card owner and/or a card serial number, and/or optionally also non-individualising marks, for example a guilloche print, logos, emblems, seals, crests, motifs, and the like. An aperture 1320 is introduced into the cover layer, through which aperture the biometric sensor 1220 is exposed outwardly and therefore can be touched for use of the card. The imprint is also interrupted in the region 1330. So that the display element 1211 is visible from the outside through this viewing window, the cover layer is formed from a transparent material, for example from transparent polycarbonate. If the cover layer is dyed or pigmented and therefore is also already opaque without imprint, it must have an aperture above the display element so that this is visible from the outside.

The cover layer is placed in the upper recess 1140 in the supporting structure layer 1100 and terminates flush with the upper side of the peripheral upper ridge 1110. This ridge runs along three sides in each case with the same width. Merely on the fourth side (on the upper side of the ID card 1000) is a through-passing slot 1111 formed in the supporting structure layer in the region of the ridge, through which slot a lanyard (carry strap) for example can be passed so that the card can be worn by its owner.

The supporting structure layer 1100 is preferably produced from FR4 material. However, another composite material can also be used. The supporting structure layer, in the region of the electronic components 1210, 1220, 1250, has apertures 1120, which for example are formed in the layer by means of a punching process. The components, after assembly of the circuit layer 1200 to the supporting structure layer, protrude into the apertures. The thickness of the supporting structure layer corresponds approximately to the height of the components above the circuit carrier layer 1230, so that the components preferably terminate approximately flush with the surface of the supporting structure layer in the recess 1140 opposite the circuit layer. In any case, the components should not protrude beyond this surface, so that they are disposed completely within the apertures. Any cavities which are formed in the assembled state between the electronic components and the material of the supporting structure layer because the apertures are larger than the components can be filled with a polymer 1150 following the assembly of these two document layers, for example with a thermoplastic polymer. This polymer is transparent and preferably colourless at least where it is used to fill the cavity in the region of the display element 1211, so that a viewer can perceive the display without difficulty. Or, the cavities are filled with the adhesive used to join the document layers. As a result of this structure, the electronic components are protected against external mechanical influences.

The circuit carrier layer 1230, similarly to the supporting structure layer 1100, is preferably produced from FR4 material, but can also consist of another composite material. It comprises apertures 1260, which can be produced by means of a punching process. Apertures of this type serve to directly connect a termination layer 1400 to the supporting structure layer via the adhesive applied to the supporting structure layer.

The cover layer 1300 terminates the layer stack formed of supporting structure layer 1100 and circuit layer 1200 towards an upper visible side 1010 of the ID card 1000. The supporting structure layer 1100 and the circuit layer 1200 are terminated towards the lower visible side 1020 by the termination layer 1400. The termination layer, similarly to the cover layer 1300, is preferably opaque and for this purpose has an imprint 1410, for example a security print, on a surface pointing towards the card interior, so that the structures of the card disposed there behind are hidden. In this case, the termination layer can be formed from a transparent polymer material, for example from transparent polycarbonate. Alternatively, the termination layer can also be produced from an opaque material. With regard to the type of security print, that which has been said with regard to the cover layer also applies for the termination layer accordingly.

The supporting structure layer 1100 not only has a (upper) recess 1140 towards the upper visible side 1010 of the ID card 1000, but preferably also a lower recess 1140' towards the lower visible side 1020. Ridges 1110, 1110' are thus formed at the edge both towards the upper visible side and towards the lower visible side, which ridges delimit the recesses at the edge. The cross-section also of the lower ridge 1110' preferably has a rectangular shape over the entire length. The circuit carrier layer 1230 is preferably exactly the same size as the lower recess and preferably can fit into this recess accurately, i.e. without play.

Both the cover layer 1300 and the termination layer 1400, parallel to their primary plane, can be larger than the recesses 1140, 1140' in the supporting structure layer 1100, more specifically exactly the same size as the supporting structure layer, wherein it is also conceivable that only one of these two layers is larger. Or, these two layers 1300, 1400 can be exactly the same size as the corresponding recesses. In this case, they can be fitted, preferably accurately, into the corresponding recess. At least if the circuit carrier layer 1230 has a thickness that is smaller than the depth of the lower recess 1140', the termination layer can additionally also be fitted into this recess. The sum of the thicknesses of the circuit carrier layer and of the termination layer is preferably exactly the same as the depth of the lower recess, so that the termination layer terminates flush outwardly with the lower ridge.

In order to join the individual document layers 1100, 1200, 1300, 1400 to one another, an adhesive can be used, by means of which document layers bearing against one another are glued to one another. A latent-reactive adhesive is preferably used for this purpose. The adhesive is applied flat for example to the two surfaces of the supporting structure layer 1100 and as applicable also to the surface of the termination layer 1400 pointing towards the card interior.

Following the assembly of the cover layer 1300, the supporting structure layer 1100, which is provided on both sides with the adhesive, and also of the circuit layer 1200 and the termination layer 1400, the layers are joined to one another. A conventional lamination process can be used for this purpose, in which the document layers are glued to one another under the action of heat and application of flat pressure.

The above-described lamination process for production of the ID card 1000 is a first variant of the production method.

The ID card 1000 can additionally also be produced in a second production variant by means of an injection moulding process, wherein individual layers of the ID card are formed. To this end, the supporting structure layer 1100 and the circuit layer 1200, similarly to the first production variant, are stacked together and preferably glued to one another, for example using a cyanoacrylate-based adhesive, and are then encapsulated with molten polymer material (molten granulate) by means of the injection moulding process, so that the upper cover layer 1300 and the lower termination layer 1400 are formed. This method variant is shown for the first and the second embodiment of the ID card 1000 according to the invention in FIGS. 5 and 7.

Figure 5:
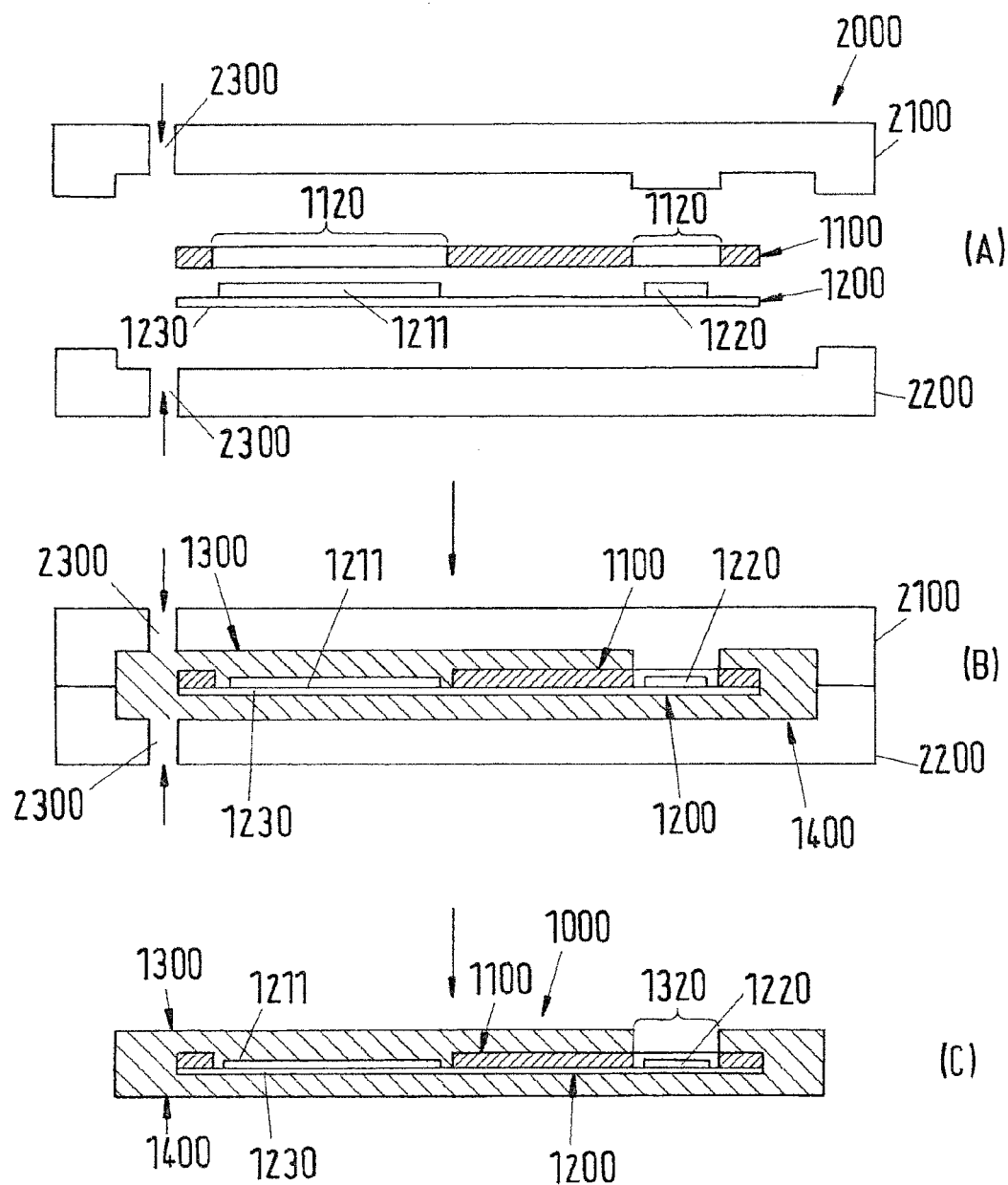
FIG. 5 shows sectional views A—A (see FIG. 1A) of a document of value or security document according to the invention in the first embodiment, produced in a second method variant; (A) before the assembly in an injection moulding process; (B) with encapsulation by means of the injection moulding process; (C) after the assembly and encapsulation.

FIG. 5 shows the method steps for producing the ID card 1000 in the first embodiment in accordance with the second method variant. Reference is made to FIGS. 1A, 3 and 4 with regard to the structure of the card parts and the finished card.

The supporting structure layer 1100 and the circuit layer 1200 are firstly provided and assembled to form a stack, so that the electronic components 1210, 1220, 1250 protrude into the apertures 1120 in the supporting structure layer. The two layers are glued to one another. This stack is then placed in an injection mould 2000, consisting of an upper mould part 2100 and a lower mould part 2200 (FIG. 5A).

Once the injection mould 2000 has been closed, layer-like cavities between the mould parts 2100, 2200 and the stack are disposed above and below the stack. Molten polymer material is injected from outside into these cavities in the usual manner at increased temperature via injection channels 2300, so that said material fills these cavities (FIG. 5B). In so doing, a cover layer 1300 is created above the stack and a termination layer 1400 is created beneath the stack. Since the moulds are shaped internally so that they are also larger than the stack in the stack plane, the polymer material surrounds the stack also in this region. If the materials of the cover layer and the termination layer are the same, no boundary is formed between the two layers. Further, the polymer material also penetrates some of the cavities formed by the apertures 1120 in the supporting structure layer and feels these, so that the electronic components 1210, 1250 disposed therein are enclosed on one side by the polymer material. This is not true, however, for the aperture into which the biometric sensor 1220 protrudes, since at this point an aperture 1320 is to be formed in the cover layer above this electronic component. The upper mould part 2100 in this case prevents the molten polymer material from filling the region above this component. Similarly to the first method variant, the injected polymer material is preferably transparent and possibly also colourless, so that the structures disposed there beneath are initially visible. It preferably consists of polycarbonate.

Once the injected polymer material has solidified, the produced ID card 1000 is removed (FIG. 5C). The polymer disposed above and below the stack formed by the supporting structure layer 1100 and the circuit layer 1200 forms the cover layer 1300 and the termination layer 1400 respectively. An aperture 1320 is disposed in the cover layer above the biometric sensor 1220. A security print (not illustrated) is preferably applied to these two layers externally. This security print can be produced using a printing ink compatible with polycarbonate, for example a polycarbonate-based printing ink. The print can be individualising, in particular personalising. It is therefore advantageous if the printing process is a digital printing process, for example an inkjet printing process. This print, lastly, can be protected by a transparent and preferably colourless protective lacquer applied subsequently.

Figure 7:
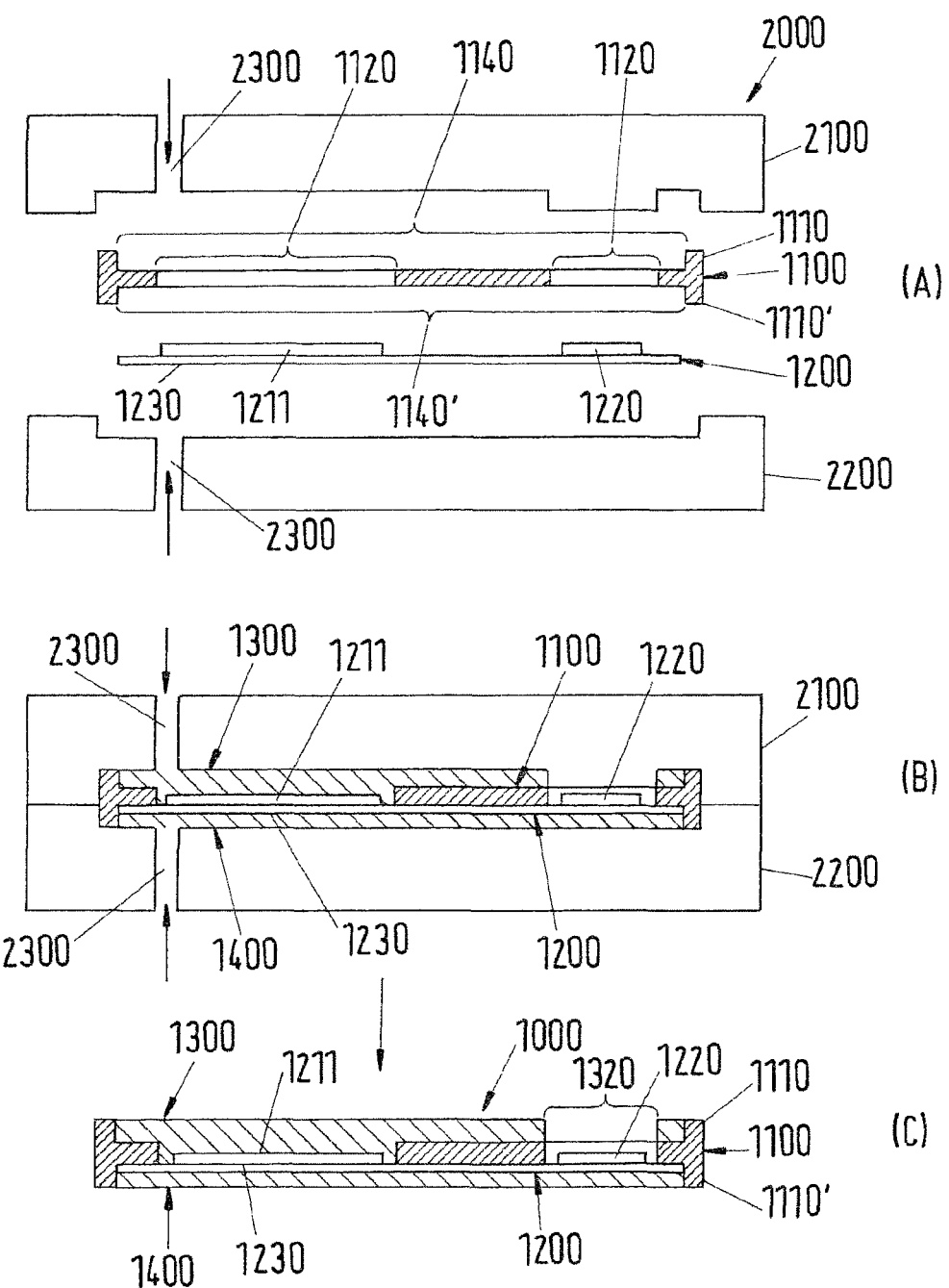
FIG. 7 shows sectional views B—B (see FIG. 1B) of a document of value or security document according to the invention in the second embodiment, produced in the second method variant; (A) before the assembly in an injection moulding process; (B) with encapsulation by means of the injection moulding process; (C) after the assembly and encapsulation.

Accordingly, the ID card 1000 in the second embodiment can also be produced by means of an injection moulding process. Reference is made in this regard to FIG. 7. Reference is made to FIGS. 1B, 2, 3 and 5 with regard to the structure of the card parts and the finished card.

Again, the supporting structure layer 1100 and the circuit layer 1200 are firstly provided and assembled, so that the electronic components 1210, 1220, 1250 protruding to the apertures 1120 in the supporting structure layer. At the time of assembly, these two layers are preferably glued to one another, for example using a cyanoacrylate-based adhesive. This stack is then placed in an injection mould 2000, consisting of an upper mould part 2100 and a lower mould part 2200 (FIG. 7A).

Once the injection mould 2000 has been closed, layer-like cavities between the moulds 2100, 2200 and the stack are disposed above and beneath the stack. Molten polymer material is injected from outside into these cavities in the usual manner at increased temperature via injection channels 2300, so that said material fills these cavities (FIG. 7B). In so doing, a cover layer 1300 is created above the stack, and a termination layer 1400 is created beneath the stack within the recesses 1140, 1140' of the supporting structure layer 1100. The polymer material also penetrates into some of the cavities formed by the apertures 1120 in the supporting structure layer and fills these, so that the electronic components 1210, 1250 disposed therein are enclosed on one side by the polymer material. This is not true, however, for the aperture into which the biometric sensor 1220 protrudes, since at this point an aperture 1320 should be formed in the cover layer above this electronic component. The upper mould part 2100 in this case prevents the molten polymer material from filling the region above this component. Similarly to the first method variant, the injected polymer material is preferably transparent and possibly also colourless, so that the structures disposed there beneath are initially visible. It preferably consists of polycarbonate.

Once the injected polymer material has solidified, the produced ID card 1000 is removed (FIG. 7C). The polymer disposed above and below the stack formed by the supporting structure layer 1100 and the circuit layer 1200 forms the cover layer 1300 and the termination layer 1400 respectively. An aperture 1320 is disposed in the cover layer above the biometric sensor 1220. A security print (not illustrated) is preferably applied to these two layers externally. This security print can be produced using a printing ink compatible with polycarbonate, for example a polycarbonate-based printing ink. The print can be individualising, in particular personalising. It is therefore advantageous if the printing process is a digital printing process, for example an inkjet printing process. This print, lastly, can be protected by a transparent and preferably colourless protective lacquer applied subsequently.

Figure 8:
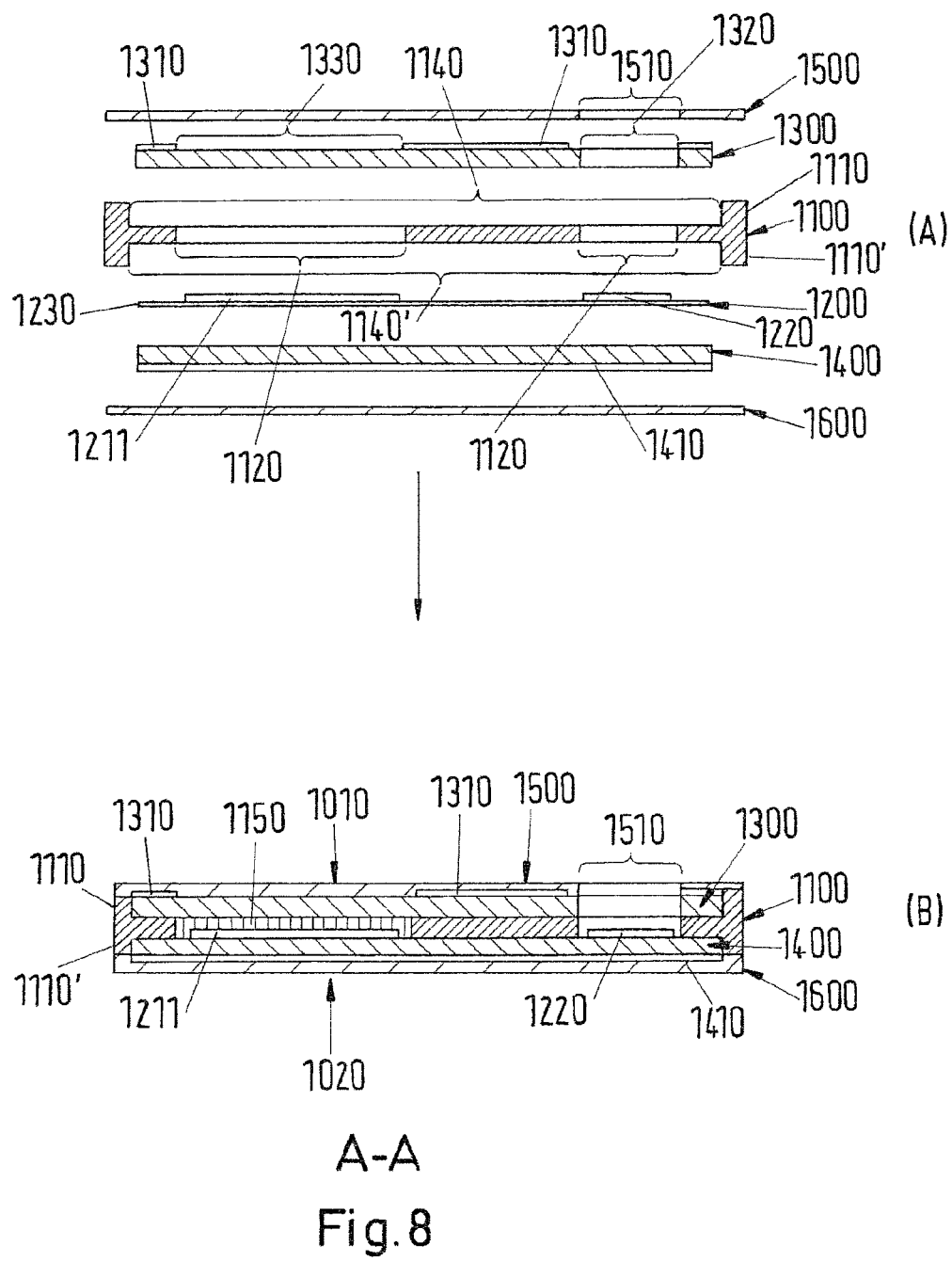
FIG. 8 shows sectional views corresponding to a section A—A (see FIG. 1A) of a document of value or security document according to the invention in a third embodiment; (A) before the assembly and joining; (B) after the assembly and joining.

FIG. 8 lastly illustrates a third embodiment of the ID card 1000 according to the invention in the state not yet assembled (FIG. 8A) and in the assembled and joined state (FIG. 8B). Individual elements of this card correspond to those of the first and second embodiment. Reference is also made in this regard to the description of these embodiments.

Proceeding from the second embodiment of the ID card 1000 according to the invention, the third embodiment differs from this in that, in addition to the cover layer 1300, the supporting structure layer 1100, the circuit layer 1200 and the termination layer 1400, an upper protective layer 1500 with an aperture 1510 is arranged on the upper visible side 1010 and a lower protective layer 1600 is arranged on the lower visible side 1020. The upper and the lower protective layer are preferably again produced from a transparent polymer material, for example from transparent polycarbonate. These two protective layers extend over the entire surface of the ID card and therefore also cover the ridges 1110, 1110' of the supporting structure layer 1100. This card therefore has the appearance according to FIG. 1A, although the supporting structure layer has upper and lower recesses 1140, 1140' for receiving the circuit layer 1200 and the cover layer 1300.

Since these two protective layers 1500, 1600 terminate the ID card 1000 outwardly, imprints can be applied externally on the cover layer 1300 and the termination layer 1400 because they are protected by the protective layers.

The ID card 1000 in this third embodiment can be produced either by means of the above-described method in the first method variant from films or by means of the above-described method in the second method variant using an injection moulding process. FIG. 8 shows the production from films. For production by means of an injection moulding process, the two protective layers 1500, 1600 can be placed for example in the injection mould 2000, so that they ultimately are arranged externally on the formed layer stack. The composite of supporting structure layer 1100, circuit layer 1200, cover layer 1300, and termination layer 1400 can be produced, similarly to the second embodiment of the ID card 1000, with the method according to the second method variant (FIG. 7). In the case of the injection moulding process, the externally placed protective layers then connect to the molten polymer material and form the outer layers of the ID card.

LIST OF REFERENCE SIGNS 1000 document of value or security document, ID card
1010 upper visible side
1020 lower visible side
1100 supporting structure layer, document layer
1110 (upper) ridge
1110' lower ridge
1111 slot
1120 aperture
1130 cavity
1140 (upper) recess
1140' lower recess
1150 polymer filling/polymer material
1200 circuit layer/document layer
1210 display device, electronic semiconductor component
1211 display element
1220 biometric sensor, fingerprint scanner device, electronic semiconductor component
1230 circuit carrier layer
1240 RFID circuit
1241 RFID IC
1242 RFID antenna
1250 central processor, electronic semiconductor component
1260 aperture 1270 electronic circuit
1300 cover layer, cover film, document layer
1310 imprint
1320 aperture
1330 interrupted region of the imprint, viewing window
1400 termination layer, termination film, document layer
1410 imprint
1500 upper protective layer
1510 aperture
1600 lower protective layer
2000 injection mould
2100 upper mould part
2200 lower mould part
2300 injection channel

The invention claimed is:

1. A document of value or security document (1000) with an electronic circuit (1270), wherein the document of value or security document (1000) is formed from at least two document layers (1100, 1200, 1300, 1400) arranged in a stack and connected to one another by means of a joining process, wherein the stack is formed by a supporting structure layer (1100) and a circuit carrier layer (1230) carrying the electronic circuit (1270), the electronic circuit comprising electronic semiconductor components (1210, 1220, 1250), wherein the supporting structure layer (1100) has at least one aperture (1120), wherein one or more cavities (1130) is formed by the at least one aperture (1120) and at least one of the electronic semiconductor components (1210, 1220, 1250),
wherein the supporting structure layer (1100) is formed from a fibre composite material, and wherein the one or more cavities (1130), which are formed by the at least one aperture (1120) and at least one of the electronic semiconductor components (1210, 1220, 1250), are filled with a polymer material (1150).

2. The document of value or security document (1000) according to claim 1, characterised in that the circuit carrier layer (1230) is formed from a fibre composite material.

3. The document of value or security document (1000) according to claim 2, characterised in that the circuit carrier layer (1230) has apertures (1260), which allow a passage of adhesive.

4. The document of value or security document (1000) according to claim 2, characterised in that the fibre composite material does not melt.

5. The document of value or security document (1000) according to claim 2, characterised in that the fibre composite material of the supporting structure layer (1100) is formed from an epoxy resin-based thermoset reinforced with glass fibre fabric.

6. The document of value or security document (1000) according to claim 5, characterised in that the fibre composite material does not melt.

7. The document of value or security document (1000) according to claim 5, characterised in that at least one electronic semiconductor component (1210, 1220, 1250) is arranged at least on one side of the circuit carrier layer (1230), in that the supporting structure layer (1100) has at least one aperture (1120), and in that the at least one electronic semiconductor component (1210, 1220, 1250) is received in a joined state by an aperture (1120) in the supporting structure layer (1100).

8. The document of value or security document (1000) according to claim 7, characterised in that the electronic circuit (1270) comprises an RFID circuit (1240), a fingerprint scanner device (1220) and a display device (1210).

9. The document of value or security document (1000) according to claim 1, characterised in that the fibre composite material does not melt.

10. The document of value or security document (1000) according to claim 1, characterised in that the fibre composite material of the supporting structure layer (1100) is formed from an epoxy resin-based thermoset reinforced with glass fibre fabric.

11. The document of value or security document (1000) according to claim 1, characterised in that the supporting structure layer (1100) has a recess (1140, 1140'), at least on one side, in order to receive the circuit carrier layer (1230), with the at least one electronic circuit (1270) carried thereby, in an accurately fitting manner.

12. The document of value or security document (1000) according to claim 1, characterised in that at least one electronic semiconductor component (1210, 1220, 1250) is arranged at least on one side of the circuit carrier layer (1230), and in that the at least one electronic semiconductor component (1210, 1220, 1250) is received in a joined state by an aperture (1120) in the supporting structure layer (1100).

13. The document of value or security document (1000) according to claim 1, characterised in that the joining process is an adhesive bonding process.

14. The document of value or security document (1000) according to claim 1, characterised in that the supporting structure layer (1100) has, at least on one side, a recess (1140) for receiving a cover layer (1300) in an accurately fitting manner.

15. The document of value or security document (1000) according to claim 1, characterised in that the electronic circuit (1270) comprises an RFID circuit (1240), a fingerprint scanner device (1220) and a display device (1210).

16. A method for producing a document of value or security document (1000) having an electronic circuit (1270), comprising the following method steps:
   (a) providing a supporting structure layer (1100) and a circuit carrier layer (1230) carrying the electronic circuit (1270);
   (b) stacking on top of one another the supporting structure layer (1100) and the circuit carrier layer (1230) carrying the electronic circuit (1270); and
   (c) connecting the supporting structure layer (1100) and the circuit carrier layer (1230) using a joining process, characterised in that the supporting structure layer (1100) is formed from a fibre composite material;
      wherein the stacking on top of each other of the supporting structure layer (1100) and the circuit carrier layer (1230) carrying the electronic circuit (1270) forms cavities (1130) by at least one aperture (1120) in the supporting structure layer (1100) and the electronic semiconductor components (1210, 1220, 1250) of the electronic circuit (1270), and
      wherein the cavities (1130) formed by at least one aperture (1120) in the supporting structure layer (1100) and the electronic semiconductor components (1210, 1220, 1250) are filled with a polymer material (1150).

17. The method according to claim 16, characterised in that the supporting structure layer (1100) and the circuit layer (1200) are connected to a cover film (1300) and a termination film (1400) using a joining process.

18. The method according to claim 16, characterised in that the stack formed of supporting structure layer (1100) and circuit layer (1200) are encapsulated with polymer material in an injection moulding process, so that a cover layer (1300) is formed on one side of the stack and a termination layer (1400) is formed on another side of the stack.

\* \* \* \* \*